(12) United States Patent
Schulte et al.

(10) Patent No.: US 10,995,854 B2
(45) Date of Patent: May 4, 2021

(54) DRIVELINE ACTUATOR UTILIZING STORED ENERGY TO MOVE AN ACTUATOR OUTPUT MEMBER

(71) Applicant: AMERICAN AXLE & MANUFACTURING, INC., Detroit, MI (US)

(72) Inventors: Michael Schulte, Sylvania, OH (US); Sylvain Angoujard, Bad Homburg (DE); Martin Buerkle, Bad Homburg (DE)

(73) Assignee: American Axle & Manufacturing, Inc., Detroit, MI (US)

( * ) Notice: Subject to any disclaimer, the term of this patent is extended or adjusted under 35 U.S.C. 154(b) by 91 days.

(21) Appl. No.: 16/094,775

(22) PCT Filed: Apr. 21, 2017

(86) PCT No.: PCT/US2017/028962
§ 371 (c)(1),
(2) Date: Oct. 18, 2018

(87) PCT Pub. No.: WO2017/185044
PCT Pub. Date: Oct. 26, 2017

(65) Prior Publication Data
US 2019/0128417 A1    May 2, 2019

Related U.S. Application Data

(60) Provisional application No. 62/326,115, filed on Apr. 22, 2016.

(51) Int. Cl.
*F16H 63/30*    (2006.01)
*F16D 23/14*    (2006.01)
(Continued)

(52) U.S. Cl.
CPC ........... *F16H 63/304* (2013.01); *F16D 11/14* (2013.01); *F16D 23/14* (2013.01); *F16D 28/00* (2013.01);
(Continued)

(58) Field of Classification Search
CPC .... F16D 2011/006; F16D 11/14; F16D 23/14; F16D 2023/141; F16D 63/304;
(Continued)

(56) References Cited

U.S. PATENT DOCUMENTS 2,854,113 A    9/1958   Hallden
4,903,808 A *  2/1990   Okubo .................... F16D 23/12
                                               192/110 B
(Continued)

OTHER PUBLICATIONS

International Search Report and Written Opinion issued in PCT/US2017/028962, dated Aug. 11, 2017; ISA/US.

*Primary Examiner* — Stacey A Fluhart
(74) *Attorney, Agent, or Firm* — Burris Law, PLLC

(57) ABSTRACT

An actuator assembly that includes a frame, an output member, a latch and a spring. The output member is movable along an axis relative to the frame between a first position and a second position. The latch has a first latch member, which is movable along the axis, and a second latch member that is coupled to the output member. The second latch member is configured to engage the first latch member to retain the actuator output member in the first position. The spring exerts a force on the actuator output member when the second latch member engages the first latch member to retain the actuator output member in the first position. The force is configured to urge the actuator output member toward the second position when the second latch member is disengaged from the first latch member.

9 Claims, 7 Drawing Sheets

(51) Int. Cl.
  *F16H 63/34* (2006.01)
  *F16D 11/14* (2006.01)
  *F16D 28/00* (2006.01)
  *F16H 25/20* (2006.01)
  *F16D 11/00* (2006.01)
  *F16D 23/12* (2006.01)

(52) U.S. Cl.
  CPC .............. *F16H 25/20* (2013.01); *F16H 63/30* (2013.01); *F16H 63/3408* (2013.01); *F16D 2011/002* (2013.01); *F16D 2023/123* (2013.01); *F16D 2023/141* (2013.01); *F16H 2063/3063* (2013.01); *F16H 2063/3089* (2013.01)

(58) Field of Classification Search
  CPC .......... F16D 28/00; F16D 25/20; F16D 63/30; F16D 63/3408; F16D 2011/002; F16D 2023/123; F16D 2063/3063; F16D 2063/3089
  See application file for complete search history.

(56) References Cited

U.S. PATENT DOCUMENTS

| | | | |
|---|---|---|---|
| 5,460,060 A * | 10/1995 | Nellums | F16H 63/304 |
| | | | 192/109 A |
| 5,735,767 A * | 4/1998 | Forsyth | F16D 23/06 |
| | | | 475/205 |
| 6,591,705 B1 | 7/2003 | Reik et al. | |
| 9,518,620 B2 * | 12/2016 | Choi | B60K 23/08 |
| 2006/0169084 A1 | 8/2006 | Meaney et al. | |
| 2011/0061487 A1 * | 3/2011 | Tooman | F16H 63/3023 |
| | | | 74/473.36 |
| 2014/0214291 A1 * | 7/2014 | Komura | F16H 61/0403 |
| | | | 701/58 |
| 2015/0107955 A1 * | 4/2015 | Tronnberg | F16D 11/10 |
| | | | 192/69.8 |
| 2015/0165892 A1 | 6/2015 | Park | |
| 2018/0023635 A1 * | 1/2018 | Neelakantan | F16D 25/082 |
| | | | 475/149 |
| 2018/0045252 A1 * | 2/2018 | Omori | F16D 11/14 |
| 2019/0152316 A1 * | 5/2019 | Wentz | B60K 23/08 |
| 2019/0264753 A1 * | 8/2019 | Creech | B60K 17/35 |

* cited by examiner

DRIVELINE ACTUATOR UTILIZING STORED ENERGY TO MOVE AN ACTUATOR OUTPUT MEMBER

CROSS-REFERENCE TO RELATED APPLICATIONS

This application is a U.S. National Phase Application under 35 U.S.C. 371 of International Application No. PCT/US2017/028962 filed on Apr. 21, 2017 and published in English as WO 2017/185044 A1 on Oct. 26, 2017, which claims the benefit of U.S. Provisional Application No. 62/326,115, filed on Apr. 22, 2016. The entire disclosure of the above-identified applications are incorporated herein by reference.

FIELD

The present disclosure relates to a driveline actuator that utilizes stored energy to move an actuator output member.

BACKGROUND

Actuators are employed in many driveline components to axially move a component between a first position and a second position.

SUMMARY

This section provides a general summary of the disclosure, and is not a comprehensive disclosure of its full scope or all of its features.

An actuator assembly that includes a frame, an output member, a latch and a spring. The output member is movable along an axis relative to the frame between a first position and a second position. The latch has a first latch member, which is movable along the axis, and a second latch member that is coupled to the output member. The second latch member is configured to engage the first latch member to retain the actuator output member in the first position. The spring exerts a force on the actuator output member when the second latch member engages the first latch member to retain the actuator output member in the first position. The force is configured to urge the actuator output member toward the second position when the second latch member is disengaged from the first latch member.

In a further form, one of the first and second latch members comprises a plunger.

In a further form, the frame includes a shaft that is parallel to the axis, wherein the actuator output member is coupled to a carriage that is slidably mounted on the shaft. Optionally, a lead screw is rotatably mounted to the frame, wherein a follower block is threadably coupled to the lead screw and wherein a spring is disposed between the follower block and the carriage. Optionally, the actuator assembly can comprise an electric motor that is configured to drive the lead screw. Also optionally, the actuator assembly can comprise a transmission disposed between the electric motor and the lead screw.

In a further form, the actuator output member comprises a fork.

In another form, the present disclosure provides an actuator assembly that includes first and second components, a helical coil spring, and a solenoid coil. The first component has a first dog clutch member non-rotatably coupled thereto. The first dog clutch member has a plurality of first dog clutch teeth. The second component has a plurality of external teeth formed thereon. The second dog clutch member has a plurality of internal teeth, an internal annular shoulder and a plurality of second dog clutch teeth. The internal teeth are engaged with the external teeth so that the second dog clutch member is non-rotatably but axially slidably mounted to the second component. The second dog clutch member is movable between a first position, in which the plurality of second dog clutch teeth engage the plurality of first dog clutch teeth to non-rotatably couple the second component to the first component, and a second position in which the plurality of second dog clutch teeth are disengaged from the plurality of first dog clutch teeth to permit relative rotation between the second component and the first component. The helical coil spring is disposed about the second component and abutted to the internal annular shoulder. The helical coil spring biases the second dog clutch member toward the first position. The solenoid coil is disposed about the second dog clutch member and is selectively operable to generate a magnetic field that moves the second dog clutch member into the second position.

In yet another form, the present disclosure provides an actuator assembly that includes a housing, first and second shafts, a sleeve, and a piston. The first shaft is rotatably disposed in the housing and has a first set of external teeth. The second shaft is rotatably disposed in the housing and has a second set of external teeth. The sleeve has a set of internal teeth and is movable between a first position, in which the internal teeth are meshed to the first and second sets of external teeth to non-rotatably couple the first and second shafts to one another, and a second position in which the internal teeth are disengaged from one of the first set of external teeth and the second set of external teeth to thereby permit relative rotation between the first and second shafts. The piston is received in the housing and is coupled to the sleeve for axial sliding movement. The piston is movable between a first one of the first and second positions to a second one of the first and second positions in response to a pressurized fluid in the housing that acts on a first surface of the piston.

In a further form, the piston is movable between the second one of the first and second positions to the first one of the first and second positions in response to a pressurized fluid in the housing that acts on a second surface of the piston. Optionally, the housing defines a first annular chamber and a second annular chamber, wherein annular portions of the piston extend into each of the first and second annular chambers.

In a further form, a bearing is disposed between the first and second shafts.

In a further form, a first bearing supports the first shaft for rotation relative to the housing and wherein a second bearing supports the second shaft for rotation relative to the housing.

In a further form, the sleeve is rotatable relative to the piston.

In a further form, the actuator assembly comprises a spring that is disposed axially between the housing and the piston and which biases the sleeve into the first position. Optionally, the spring is disposed radially about the second shaft.

In a further form, the actuator assembly comprises a spring that is disposed axially between the housing and the piston and which biases the sleeve into the second position. Optionally, the spring is disposed radially about the first shaft.

In still another form, the present teachings provide a method for operating an actuator assembly that includes: providing an actuator assembly having a frame, a lead screw rotatably mounted to the frame, a carriage slidably mounted to the frame, a follower threadably coupled to the lead screw, a spring disposed between the follower and the carriage, an actuator output member coupled to the carriage for movement therewith along an axis, and a latch, the latch having a movable latch member that is coupled to the carriage for movement therewith along the axis; rotating the lead screw in a first rotational direction to compress the spring between the follower and the carriage; positioning the actuator output member in a first position along the axis; further rotating the lead screw in the first rotational direction to drive the follower over the movable latch member, wherein engagement of the movable latch member to the follower maintains the spring in a compressed state; rotating the lead screw in a second, opposite rotational direction to directly engage the follower to the movable latch member; further rotating the lead screw in the second rotational direction to position the actuator output member in a second position along the axis that is spaced apart from the first position; and unlatching the movable latch member from the follower to permit energy stored in the spring to translate the actuator output member toward the first position.

In a further form, unlatching the movable latch member from the follower comprises further rotating the lead screw in the second rotational direction to drive the movable latch member against a ramp to move the movable latch member in to a retracted state.

In a further form, further rotating the lead screw in the first rotational direction to drive the follower over the movable latch member comprises engaging a ramp on the follower to the movable latch member to move the movable latch member into a retracted state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
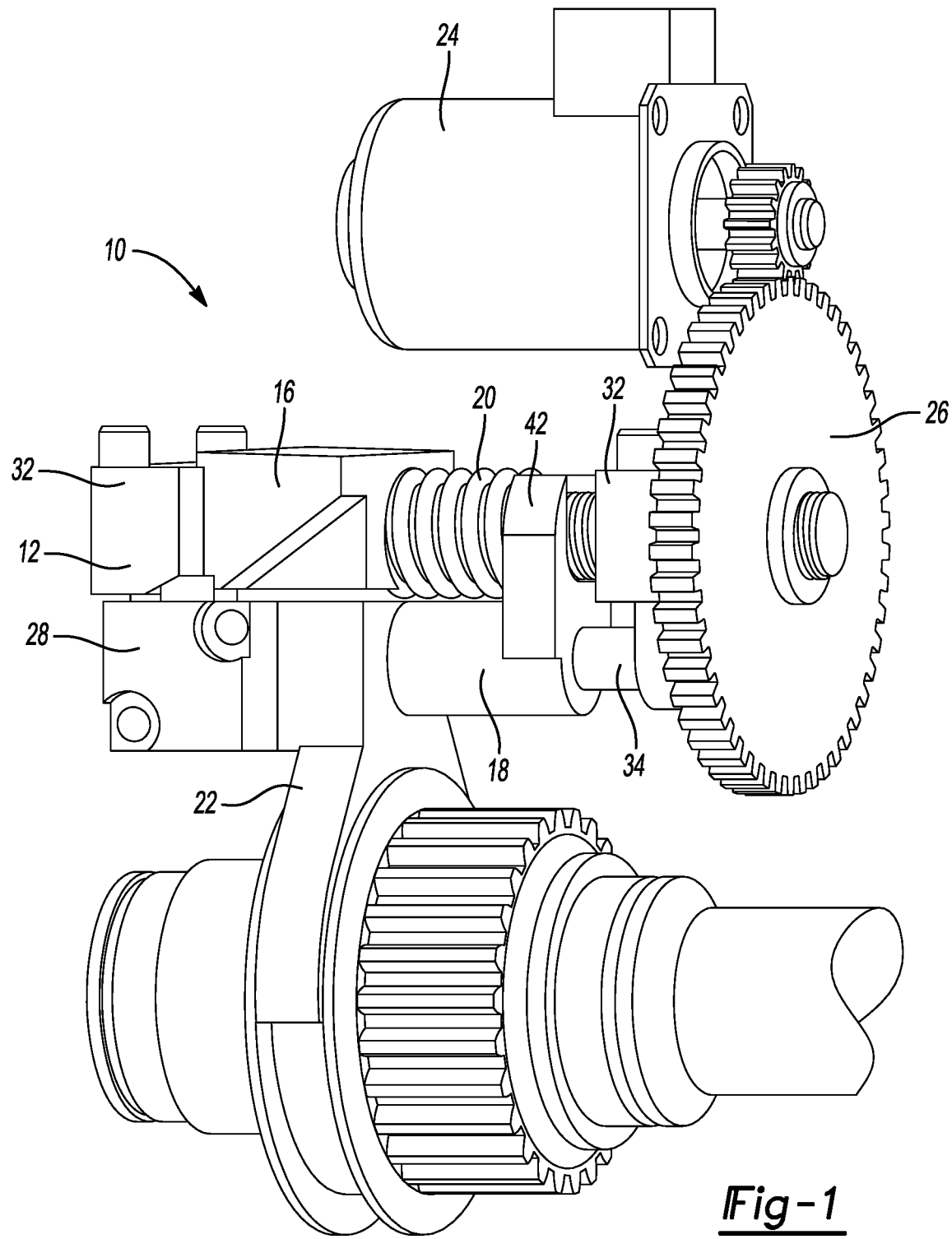
FIG. 1 is a perspective view of an actuator assembly constructed in accordance with the teachings of the present disclosure.
Figure 2:
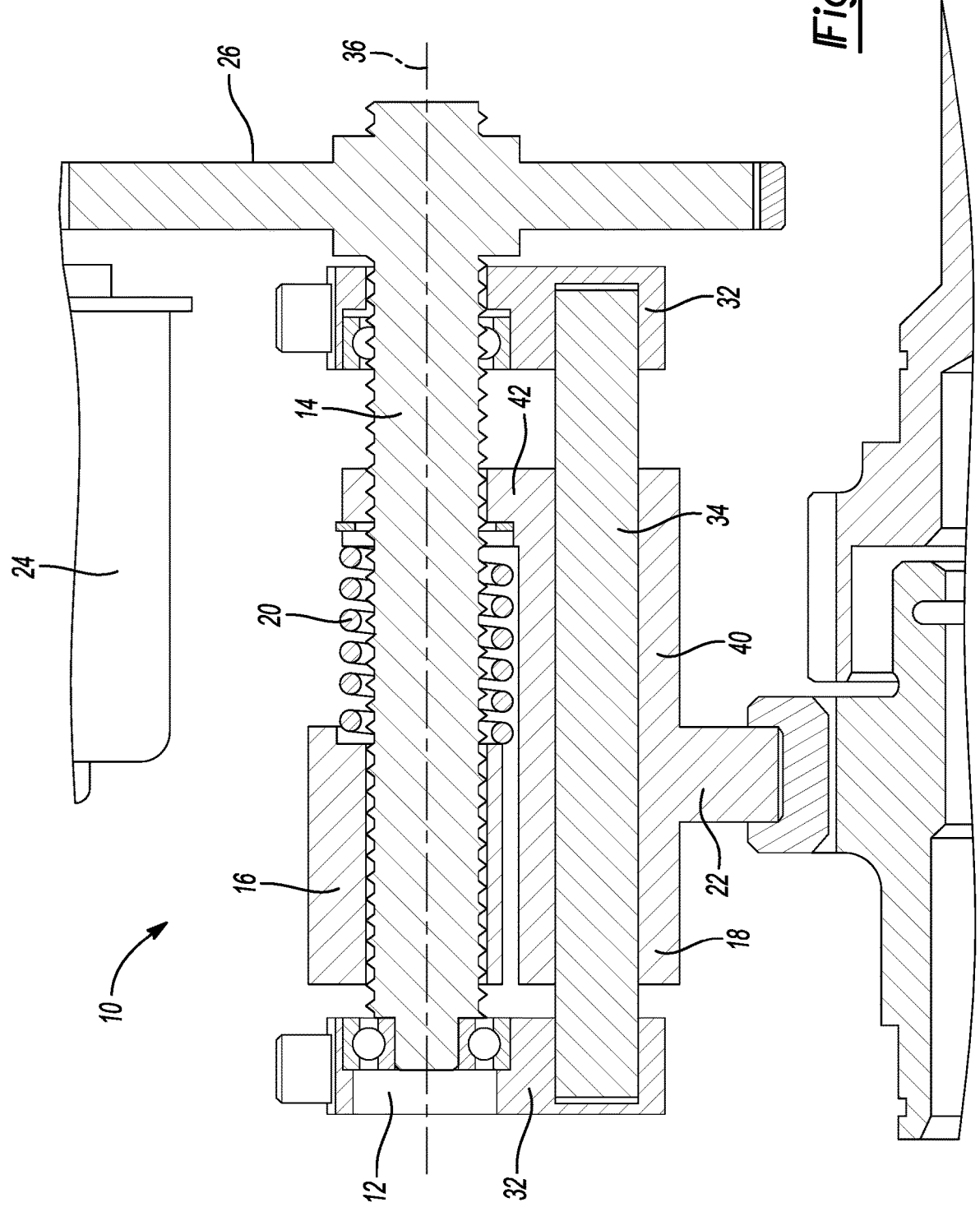
FIG. 2 is a longitudinal cross-sectional view of a portion of the actuator assembly of FIG. 1.

With reference to FIGS. 1 through 4 of the drawings, a first actuator assembly constructed in accordance with the teachings of the present disclosure is generally indicated by reference numeral 10. The actuator assembly 10 is configured to translate an axially movable element in a driveline component between two positions, to cause the driveline component to operate in two different modes. The axially movable element could be associated with a coupling or torque transmitting device that is employed to selectively transmit rotary power through the device or a portion of the device, or could be associated with a multi-speed transmission and could be employed to selectively activate and/or deactivate a gear reduction and/or to selectively lock components of the multi-speed transmission to one another for common rotation.

The actuator assembly 10 can include a frame 12, a lead screw 14, follower block 16, a carriage 18, a spring 20, an actuator output member 22, an electric motor 24, a transmission 26, and a latch 28. The frame 12 can comprise a pair of brackets 32 and a shaft 34 that is disposed between and fixedly coupled to the brackets 32. The lead screw 14 can be mounted to the brackets 32 for rotation about a rotary axis 36 that can be generally parallel to an axis along which the sliding shaft 34 is disposed. In the example provided, the lead screw 14 is supported on opposite ends via bearings that are mounted to the brackets 32. The follower block 16 can be threaded to the lead screw 14.

The carriage 18 can comprise a central section 40 and a spring seat 42. The central section 40 can have a bore formed therethrough into which the shaft 34 can be received to permit the central section 40 to be slidably disposed on the shaft 34. The central section 40 can abut the follower block 16 on one side to inhibit rotation of the follower block 16 about the rotary axis 36 as well as to permit the follower block 16 to push the central section 40 of the carriage 18 along the shaft 34 in a direction away from the transmission 26. The spring seat 42 can be fixedly coupled to the central section 40 and can extend therefrom so that it is received about the lead screw 14. In the example provided, the spring seat 42 includes an arm, which extends away from the central section 40, and a generally U-shaped foot. The spring 20 can be received concentrically about the lead screw 14 and can be disposed between the follower block 16 and the U-shaped foot of the spring seat 42 on the carriage 18. The actuator output member 22 can be configured in any desired manner to interact with the moveable element of the driveline component.

In the example provided, the movable element is a sliding collar 50 that is employed to selectively couple a first shaft 52 to a second shaft 54. The first shaft 52 has a plurality of first external spline teeth that are meshed with a plurality of internal spline teeth formed on the sliding collar 50 and the second shaft 54 has a plurality of second external spline teeth. The sliding collar 50 is movable between a first position (shown in FIGS. 1 and 3) and a second position. When positioned in the first position, the sliding collar 50 is spaced apart from the second shaft 54 so that the internal spline teeth are engaged only to the first external spline teeth on the first shaft 52. In this condition, rotary power is not transmitted between the first shaft 52 and the second shaft 54. When positioned in the second position, the internal spline teeth are meshed with both the first external spline teeth and the second external spline teeth to thereby couple the second shaft 54 to the first shaft 52 for common rotation. While not shown, various techniques could be employed to aid in aligning the second external spline teeth to the internal spline teeth, such as axial tapering of the lead of the second external spline teeth or the internal spline teeth on one or more sides of the spline teeth.

The electric motor 24 and transmission 26 are configured to provide rotary power to the lead screw 14 to rotate the lead screw 14 about the rotary axis 36. The electric motor 24 can be any type of motor, such as a brushless DC motor, a servo motor or a stepper motor. The transmission 26 can include an input gear, which can be coupled to an output shaft of the electric motor 24 for rotation therewith, and an output gear that can be coupled to the lead screw 14 for common rotation. If desired, one or more intermediate gears (not shown) could be disposed between the input and output gears to provide a desired gear reduction.

The latch 28 is configured to releasably couple the carriage 18 to another structure, such as the frame 12, to inhibit movement of the carriage 18 along the shaft 34 from a desired position, such as a position that corresponds to placement of the sliding collar 50 in the first position. Latches are well known and as such, a detailed discussion of the latch 28 is not needed herein. Briefly, the latch 28 can include a first portion, which can be mounted to the carriage 18, and a second portion that can be coupled to the frame 12. In the particular example provided, the first portion is a detent that comprises a plunger 60, which is a movable portion of the latch, and a plunger spring 62. The plunger 60 can be received into a hole 64 in the carriage 18 that is generally perpendicular to the bore in the central section 40. The plunger spring 62 can be received between the central section 40 and the plunger 60 and can bias the plunger 60 outwardly from the central section 40. The second portion of the latch 28 can be a hole 66 that is formed in the frame 12 and configured to receive the plunger 60. It will be appreciated that alignment of the plunger 60 to the hole 66 in the frame 12 can permit the plunger spring 62 to urge the plunger 60 outwardly so that it may engage the hole 64 in the frame 12 to thereby releasably secure the carriage 18 to the frame 12.

The actuator assembly 10 can be configured to translate the sliding collar 50 from the second position to the first position by rotating the lead screw 14 to drive the follower block 16 in a direction along the rotary axis 36 away from the output gear. Contact between the follower block 16 and the central section 40 of the carriage 18 can cause the follower block 16 to push the central section 40 along the shaft 34 to correspondingly position the sliding collar 50 in the first position. As the sliding collar 50 nears the first position, the contact between the plunger 60 and the frame 12 can urge the plunger 60 toward the carriage 18 against the bias of the plunger spring 62 and when the plunger 60 is aligned to the hole 66 in the frame 12, the plunger spring 62 can urge the plunger 60 outwardly into the hole 66 in the frame 12 to thereby releasably couple the carriage 18 to the frame 12. Thereafter, the lead screw 14 can be rotated in an opposite rotational direction to cause the follower block 16 to move axially toward the output gear and compress the spring 20 between the follower block 16 and the U-shaped foot of the spring seat 42. It will be appreciated that the spring 20, when in this compressed condition, will exert a biasing force on the U-shaped foot of the spring seat 42 that urges the carriage 18 toward the output gear.

When the sliding collar 50 is to be moved from the first position to the second position, the latch 28 can be released (to decouple the first and second portions of the latch 28 from one another) to decouple or release the carriage 18 from the frame 12. Once released, the force on the carriage 18 that is applied by the spring 20 can immediately translate the carriage 18 along the shaft 34 toward the output gear to thereby translate the actuator output member 22 so that the sliding collar 50 can be positioned in the second position. In a situation where the internal spline teeth of the sliding collar 50 are not able to meshingly engage the second external teeth on the second shaft 54, the spring 20 will remain compressed and will maintain the force on the carriage 18, which is transmitted to the sliding collar 50 via the actuator output member 22, to cause the sliding collar 50 to engage the second shaft 54 when the internal spline teeth are aligned to the second external spline teeth. It will be appreciated that a decoupling actuator (not specifically shown), such as a solenoid, could be employed to decouple the first and second portions of the latch 28 from one another.

Figure 3:
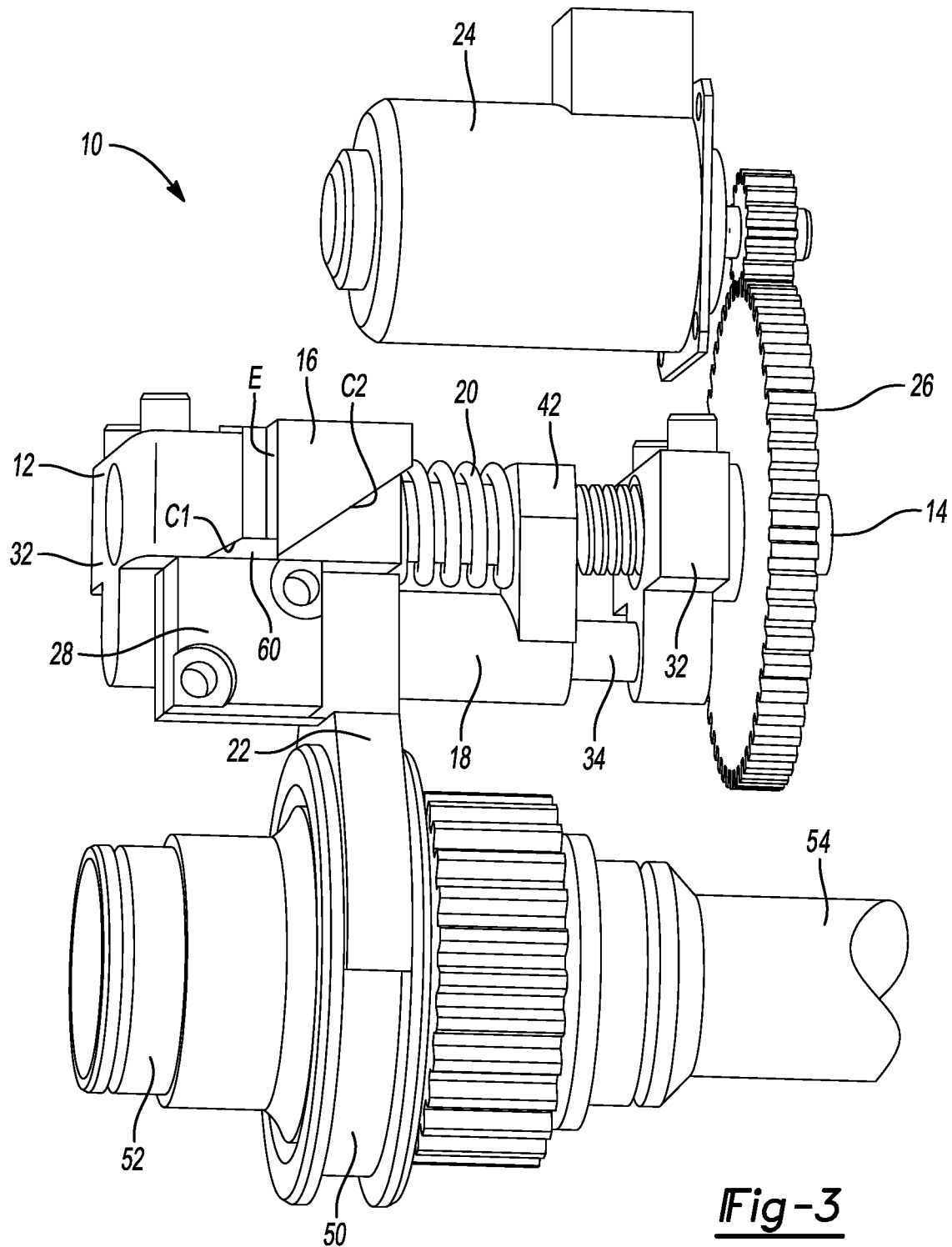
FIG. 3 is another perspective view of the actuator assembly of FIG. 1.
Figure 4:
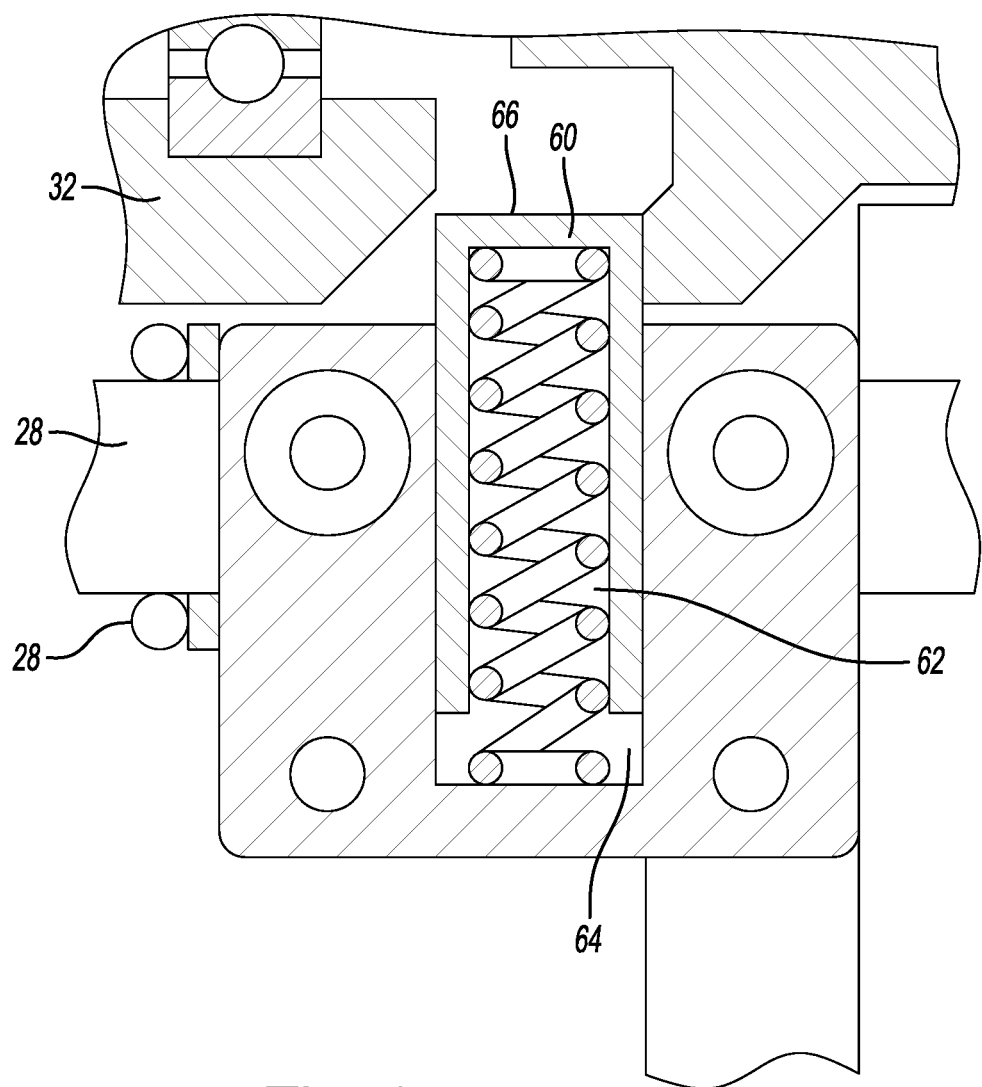
FIG. 4 is a sectional view of a portion of the actuator assembly of FIG. 1.

Alternatively, a cam C1 could be coupled to the frame 12 (e.g., to the left bracket 32 in FIG. 3) and an edge E of the follower block 16 and could interact with the plunger 60 (i.e., push the plunger 60 and the carriage 18 to the left in FIG. 3) to cause the plunger 60 to travel over the cam C1 and retract to thereby permit the carriage 18 to be urged toward the output gear by the force of the spring 20. To reset the latch 28, which could be performed immediately after the carriage 12 is urged toward the output gear, the lead screw 14 can be rotated to drive the follower block 16 toward the output gear. Contact between the frame 12 (e.g., the right follower block 32 in FIG. 3) and the carriage 12 can inhibit further movement of the carriage 12 toward the right in FIG. 3 and permit the follower block 16 to compress the spring 20 between the follower block 16 and the U-shaped foot of the spring seat 42, as well as translate a second cam C2 over the plunger 60 to cause the plunger 60 to retract. Retraction of the plunger 60 permits the edge E of the follower block 16 to travel over the plunger 60; the plunger spring 62 can urge the plunger 60 outwardly once the edge E of the follower block 16 has cleared the plunger 60.

Thereafter, when the actuator output member 22 is to be moved to move the sliding collar 50 to the first position, the rotational direction of the lead screw 14 can be reversed to drive the follower block 16 away from the output gear. Because the edge E of the follower block 16 is engaged to the plunger 60, (a) the spring 20 remains compressed between the follower block 16 and the spring seat 42 while the follower block 16 moves toward the left bracket 32, and (b) translates the plunger 60 (and the carriage 12 with it) with the follower block 16. Movement of the follower block 16 along the rotary axis away from the output gear can be halted when the collar 50 is positioned in the first position and the actuator output member 22 and carriage 12 are in corresponding positions, but prior to a point at which the plunger 60 is urged inwardly by the cam C1 on the frame 12 to a point where the plunger 60 could retract sufficiently to permit the spring 20 to move the carriage 12 toward the output gear.

It will be appreciated from the above discussion that to cause the plunger 60 to interact with the cam C1 on the frame 12 (to release the latch 28 to permit the spring 20 to translate the carriage 12 toward the output gear), the lead screw 14 must be driven to cause the follower block 16 along the rotary axis in a direction away from the output gear. As noted above, this permits the edge E of the follower block 16 to push the plunger 60 against the cam C1 so that the cam C1 causes the plunger 60 to retract.

It will be appreciated that positioning of the follower block 16 along the lead screw 14 and/or relative positioning between the frame 12 and the carriage 18/actuator output member 22 would be desirable to control operation of the electric motor 24 and to determine the position of the sliding collar 50. Various sensors could be employed to obtain such information, including a rotary sensor that is employed to determine the rotational position of the rotor of the electric motor 24 or the rotational position of the lead screw 14, which could be employed to determine a position of the follower block 16 along the rotary axis. Alternatively, position sensors could be employed to identify the position of the follower block 16 along the rotary axis. It will also be appreciated that the plunger 60 could be operated by a solenoid (not shown), in which case one or more of the various cam surfaces could be eliminated if desired.

It will be appreciated that the actuator assembly 10 can be configured to provide relatively high force to cause engagement of the sliding collar 50 with the second shaft 54 and that engagement can occur much quicker than if the carriage 18 were to be moved along the shaft 34 at the same speed in which the follower block 16 is translated by the lead screw 14. It will also be appreciated that while the movable element of the driveline component has been illustrated and described as being a sliding collar, the movable element could be configured differently, such as a movable dog that is part of a dog clutch, or a pressure plate that is part of a friction clutch.

Figure 5:
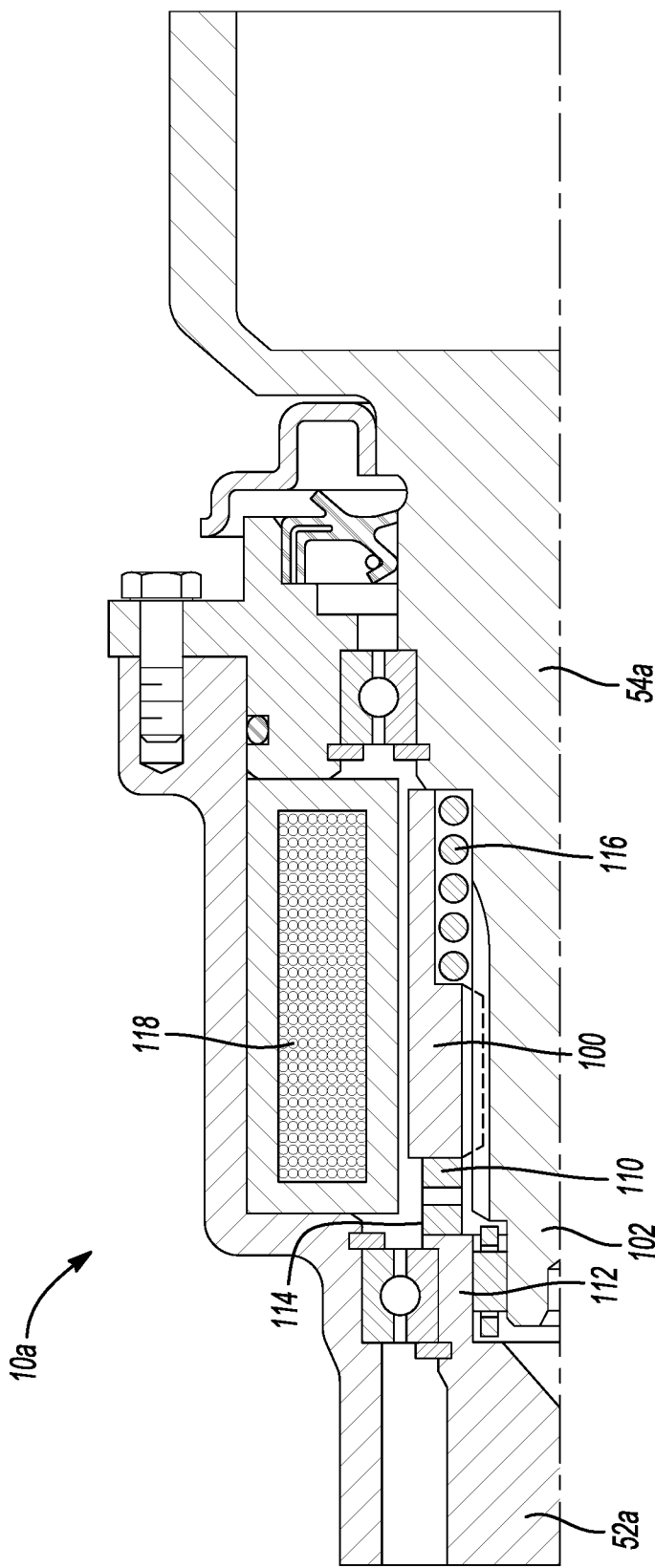
FIG. 5 is a longitudinal section view of a second actuator assembly constructed in accordance with the teachings of the present disclosure.

With reference to FIG. 5, a second actuator assembly constructed in accordance with the teachings of the present disclosure is generally indicated by reference numeral 10a. In this example, the axially movable element is a movable dog 100 of a dog clutch 102 that is employed to selectively couple a first shaft 52a to a second shaft 54a. The second shaft 54a includes a plurality of external spline teeth that are meshed with internal spline teeth formed on the movable dog 100. The movable dog 100 has a plurality of first dog teeth 110 that are disposed circumferentially about an axial end face of the movable dog 100. A fixed dog 112 is fixedly coupled to the first shaft 52a and comprises a plurality of second dog teeth 114 that are disposed circumferentially about an axial end face of the fixed dog 112. A spring 116 biases the movable dog 100 along the second shaft 54 toward the fixed dog 112. An electromagnet 118 is disposed about the movable dog 100 and is configured to selectively create a magnetic field that urges the movable dog 100 in a direction away from the fixed dog 112. It will be appreciated that the magnetic field that is created when the electromagnet 118 is operated is of sufficient strength to apply a force to the movable dog 100 that overcomes the biasing force that is applied by the spring 116 to the movable dog 100.

When transmission of rotary power through the dog clutch 102 is desired, the electromagnet 118 can be deactivated (i.e., so that the magnetic field is not generated) to thereby permit the spring 116 to rapidly translate the movable dog 100 into engagement with the fixed dog 112.

Figure 6:
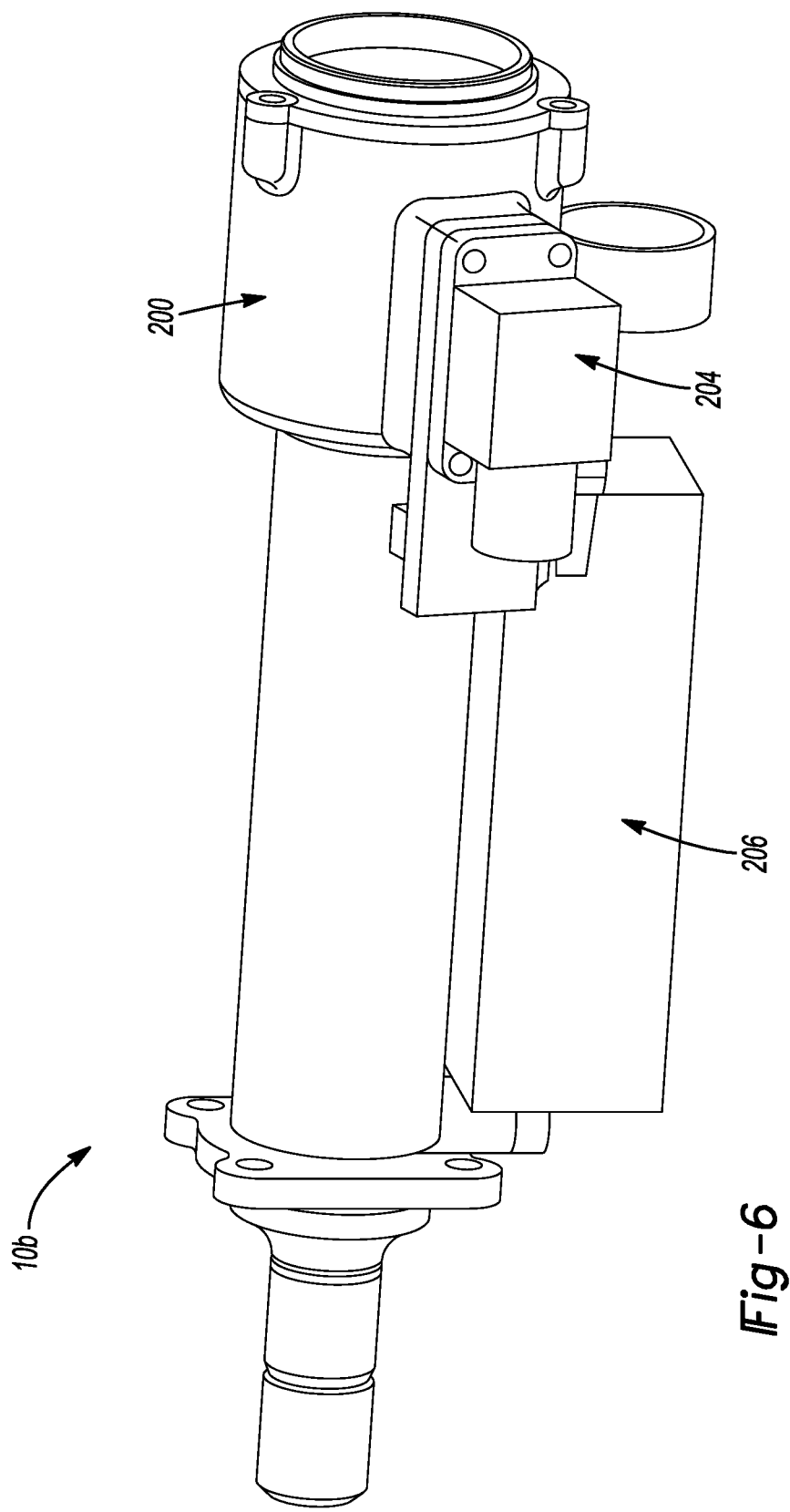
FIG. 6 is a perspective view of a third actuator assembly constructed in accordance with the teachings of the present disclosure.
Figure 7:
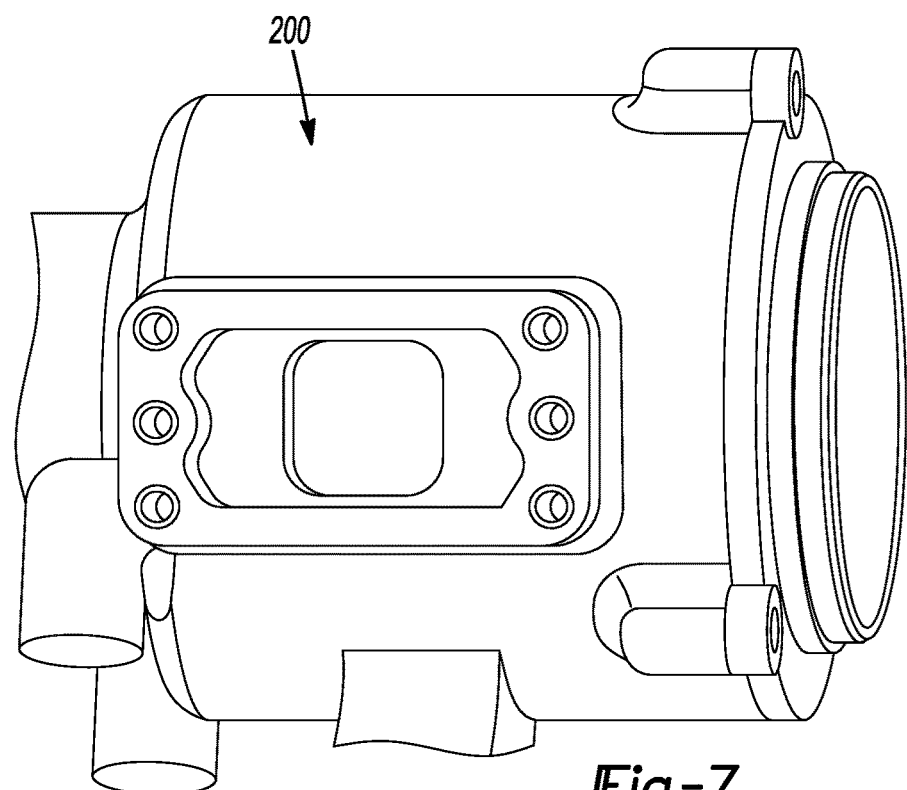
FIG. 7 is a perspective view of a portion of the actuator assembly of FIG. 6.
Figure 8:
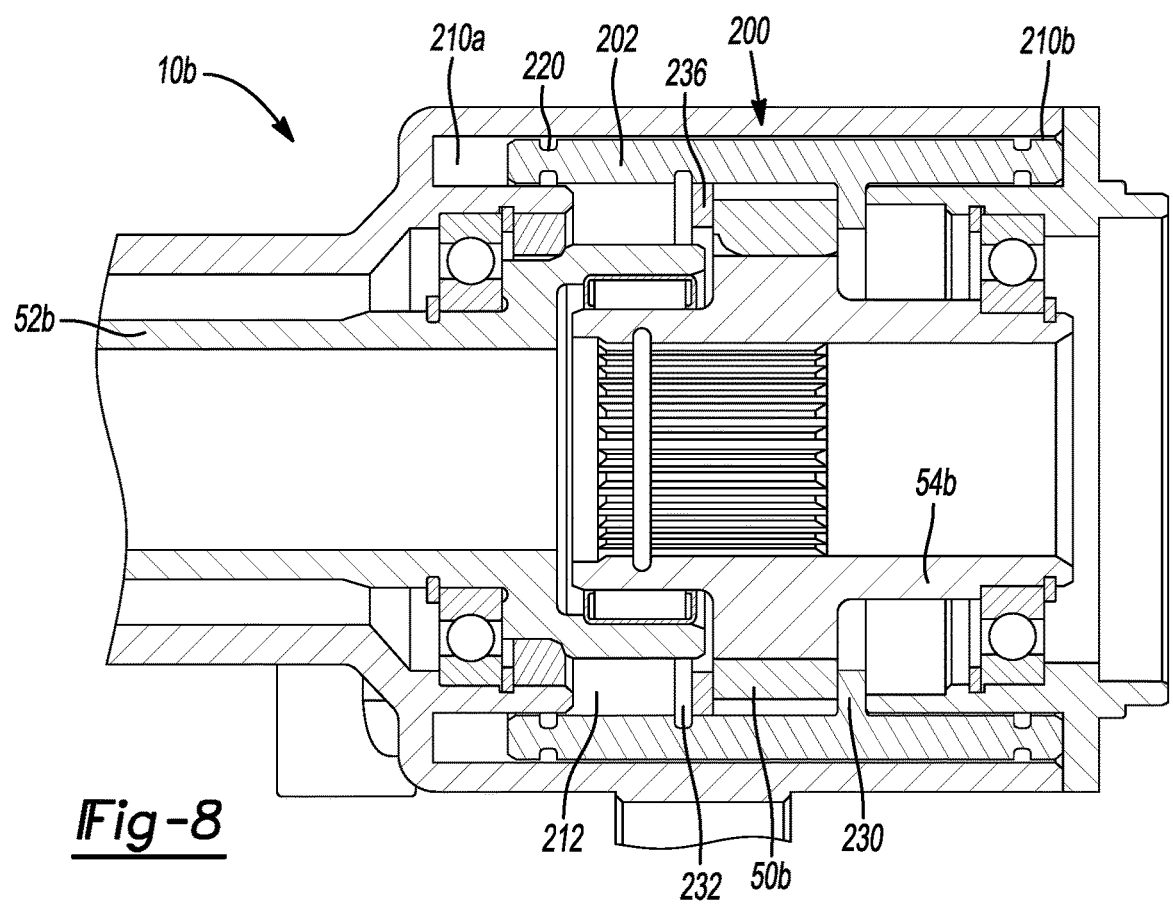
FIG. 8 is a longitudinal section view of a portion of the actuator assembly of FIG. 6.

With reference to FIGS. 6 through 8, a third actuator assembly constructed in accordance with the teachings of the present disclosure is generally indicated by reference numeral 10b. In this embodiment, the actuator assembly 10b comprises a fluid cylinder having a cylinder housing 200, a piston 202 that is translatable within the cylinder housing 200, a valve assembly 204 and a source of pressurized fluid 206. The cylinder housing 200 can be disposed about the first and second shafts 52b and 54b, respectively. The cylinder housing 200 can define two annular chambers 210a and 210b that are spaced axially apart by a central section 212.

The movable element can be a sliding collar 50b that can be disposed in the central section 212. The sliding collar 50b can have internal spline teeth that are engaged to external spline teeth on the second shaft 54b. The sliding collar 50b can be moved in into a position where the internal spline teeth also engage external spline teeth formed on the first shaft 52b to thereby couple the first and second shafts 52b and 54b for common rotation.

The piston 202 can be an annular structure having a pair of end segments 220 that can be received into the annular chambers 210a and 210b. The piston 202 can define a circumferentially extending channel that is bounded on opposite axial ends by first and second annular walls 230 and 232 that extend into the central section 212 of the cylinder housing 200. The sliding collar 50b can be received in the circumferentially extending channel between first and second annular walls 230 and 232. The first annular wall 230 can be integrally and unitarily formed with a body of the piston 202, while the second annular wall 232 can comprise a snap ring that can be removeably coupled to the body of the piston 202. If desired, a spacer 236 can be disposed between the sliding collar 50 and one or both of the first and second annular walls 230 and 232 to eliminate excess space between the sliding collar 50 and the first and second annular walls 230 and 232. If desired, the spacer 236 could be configured to a resilient material to provide a modicum of cushioning or damping between the piston 202 and the sliding collar 50.

Seals are disposed on the inside and outside circumferential surfaces of the end segments 220 to sealingly engage the inner and outer walls of the annular chambers 210a and 210b of the cylinder housing 200.

Each of the annular chambers 210a and 210b is in fluid communication with the valve assembly 204, and the valve assembly 204 is in fluid communication with the source of pressurized fluid 206. The valve assembly 204 can be operated in a first condition, in which a first one of the annular chambers 210a is coupled to the source of pressurized fluid 206 and the other one of the annular chambers 210b is vented (e.g., to the atmosphere or to a fluid reservoir from which the source of pressurized fluid 206 draws fluid), and a second condition in which the first one of the annular chambers 210a is vented and the other one of the annular chambers 210b is coupled to the source of pressurized fluid 206. In the example provided, the source of pressurized fluid 206 comprises an air compressor and a tank or reservoir for holding pressurized air, but it will be appreciated that an incompressible fluid could be employed in the alternative.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator assembly comprising:
   a frame;
   an actuator output member that is movable along an axis relative to the frame between a first position and a second position;
   a latch having a first latch member, which is coupled to the frame, and a second latch member that is coupled to the actuator output member, the second latch member being configured to lockingly engage the first latch member to inhibit relative movement between the first and second latch members along the axis to retain the actuator output member in the first position; and a spring that exerts a force on the actuator output member when the second latch member engages the first latch member to retain the actuator output member in the first position, the force being configured to urge the actuator output member toward the second position when the second latch member is disengaged from the first latch member.

2. The actuator assembly of claim 1, wherein one of the first and second latch members comprises a plunger.

3. The actuator assembly of claim 1, wherein the frame includes a shaft that is parallel to the axis, wherein the actuator output member is coupled to a carriage that is slidably mounted on the shaft.

4. The actuator assembly of claim 3, wherein a lead screw is rotatably mounted to the frame, wherein a follower block is threadably coupled to the lead screw and wherein the spring is disposed between the follower block and the carriage.

5. The actuator assembly of claim 4, further comprising an electric motor that is configured to drive the lead screw.

6. The actuator assembly of claim 5, further comprising a transmission disposed between the electric motor and the lead screw.

7. The actuator assembly of claim 1, wherein the actuator output member comprises a fork.

8. An actuator assembly comprising:
a frame having a shaft;
a carriage that is slidably mounted on the shaft;
a fork that is coupled to the carriage for movement therewith along the shaft, the fork being movable along the shaft between a first position and a second position;
a sleeve movable along an axis that is parallel to the shaft, the sleeve being mounted to the fork such that the sleeve is rotatable within the fork and is coupled to the fork for axial movement;
a latch having first and second latch portions, the first latch portion being mounted to the carriage, the second latch portion being coupled to the frame, wherein one of the first and second latch portions comprises a plunger, and wherein the other one of the first and second latch portions defines an aperture that is configured to receive the plunger, wherein receipt of the plunger into the aperture inhibits movement of the carriage along the shaft; and
a spring that exerts a force on the carriage when the plunger is received in the aperture, the force being configured to urge the fork toward the second position when the plunger is withdrawn from the aperture.

9. The actuator assembly of claim 8, wherein a lead screw is rotatably mounted to the frame, wherein a follower block is threadably coupled to the lead screw and wherein the spring is disposed between the follower block and the carriage.

* * * * *